United States Patent [19]
Cromwell

[11] 3,971,000
[45] July 20, 1976

[54] COMPUTER-DIRECTED PROCESS CONTROL SYSTEM WITH INTERACTIVE DISPLAY FUNCTIONS

[75] Inventor: Nicholas O. Cromwell, Sharon, Mass.

[73] Assignee: The Foxboro Company, Foxboro, Mass.

[22] Filed: Aug. 13, 1975

[21] Appl. No.: 604,092

Related U.S. Application Data

[63] Continuation of Ser. No. 481,180, June 20, 1974, which is a continuation of Ser. No. 419,444, Nov. 27, 1973, which is a continuation of Ser. No. 229,077, Feb. 24, 1972.

[52] U.S. Cl............................ 340/172.5; 340/324 A
[51] Int. Cl.².............................................. G06F 3/14
[58] Field of Search...... 340/172.5, 324 A, 324 AD; 445/1

[56] References Cited
UNITED STATES PATENTS

| | | | |
|---|---|---|---|
| 3,484,748 | 12/1969 | Greenbaum et al. | 340/324 A X |
| 3,579,196 | 5/1971 | Gregg, Jr. et al. | 340/172.5 |
| 3,588,838 | 6/1971 | Felcheck | 340/172.5 |
| 3,603,966 | 9/1971 | Gregg, Jr. et al. | 340/324 A |
| 3,643,219 | 2/1972 | Heimann | 340/172.5 |
| 3,686,639 | 8/1972 | Fletcher | 340/172.5 |

*Primary Examiner*—Harvey E. Springborn
*Attorney, Agent, or Firm*—Parmelee, Johnson & Bollinger

[57] ABSTRACT

An industrial process control system including a digital computer arranged in a time-share configuration to perform calculations respecting a plurality of process conditions, and to produce corresponding command signals for respective process operators such as valves and the like. The system includes an operator's console unit having a CRT display controlled by a local memory controllable by a keyboard, and by the computer in response to action from the keyboard. Special process-oriented displays can be presented on the CRT, such as fill-in-the-blanks forms into which the operator can insert new values, or other information. The keyboard includes a number of distinctive function keys which serve, in cooperation with the special CRT displays, to present information to the computer for processing, to aid in controlling the process.

11 Claims, 23 Drawing Figures

Fig. 2a
Fig. 4
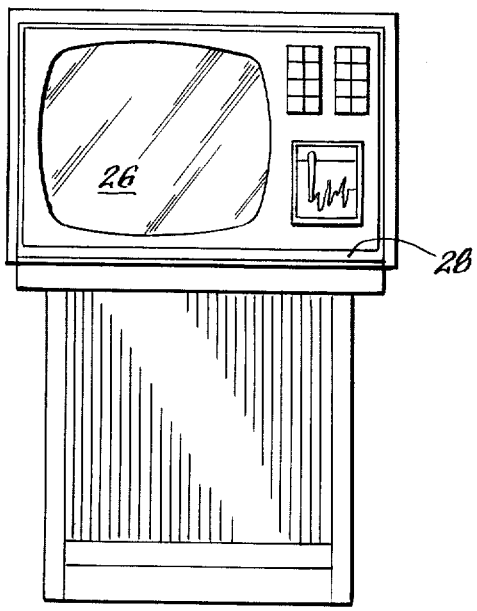
Fig. 2b
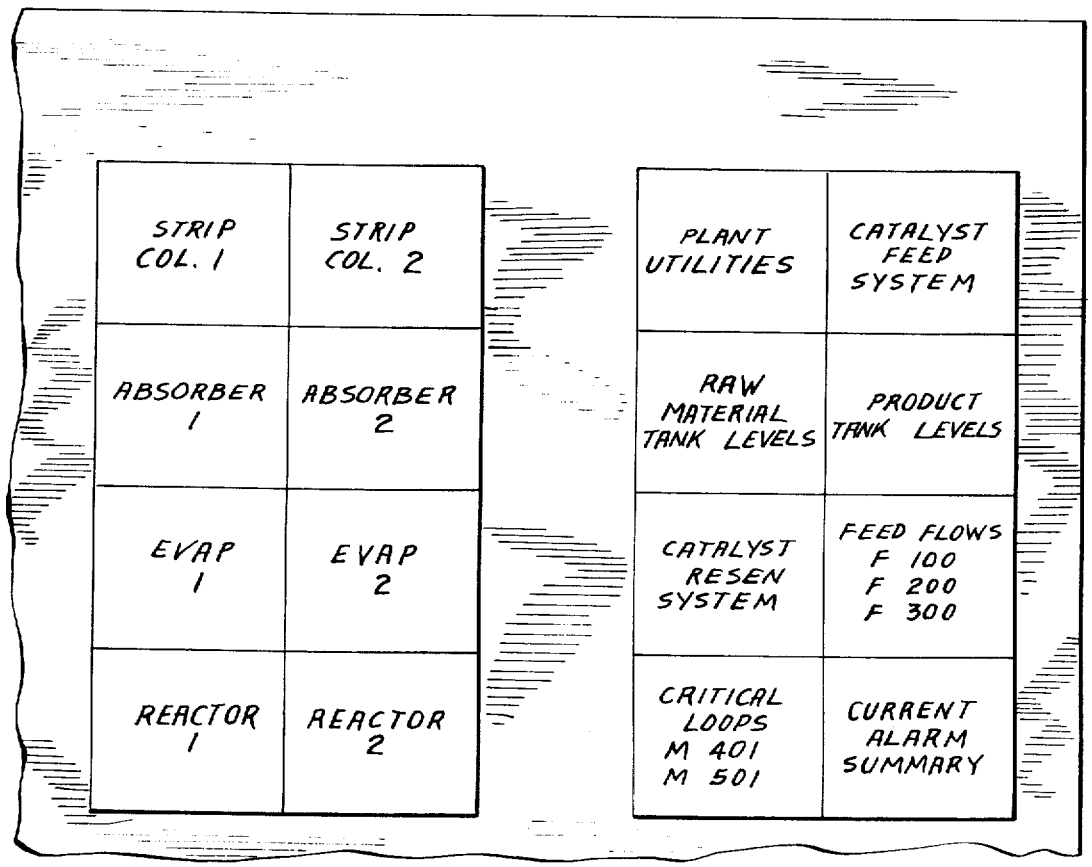

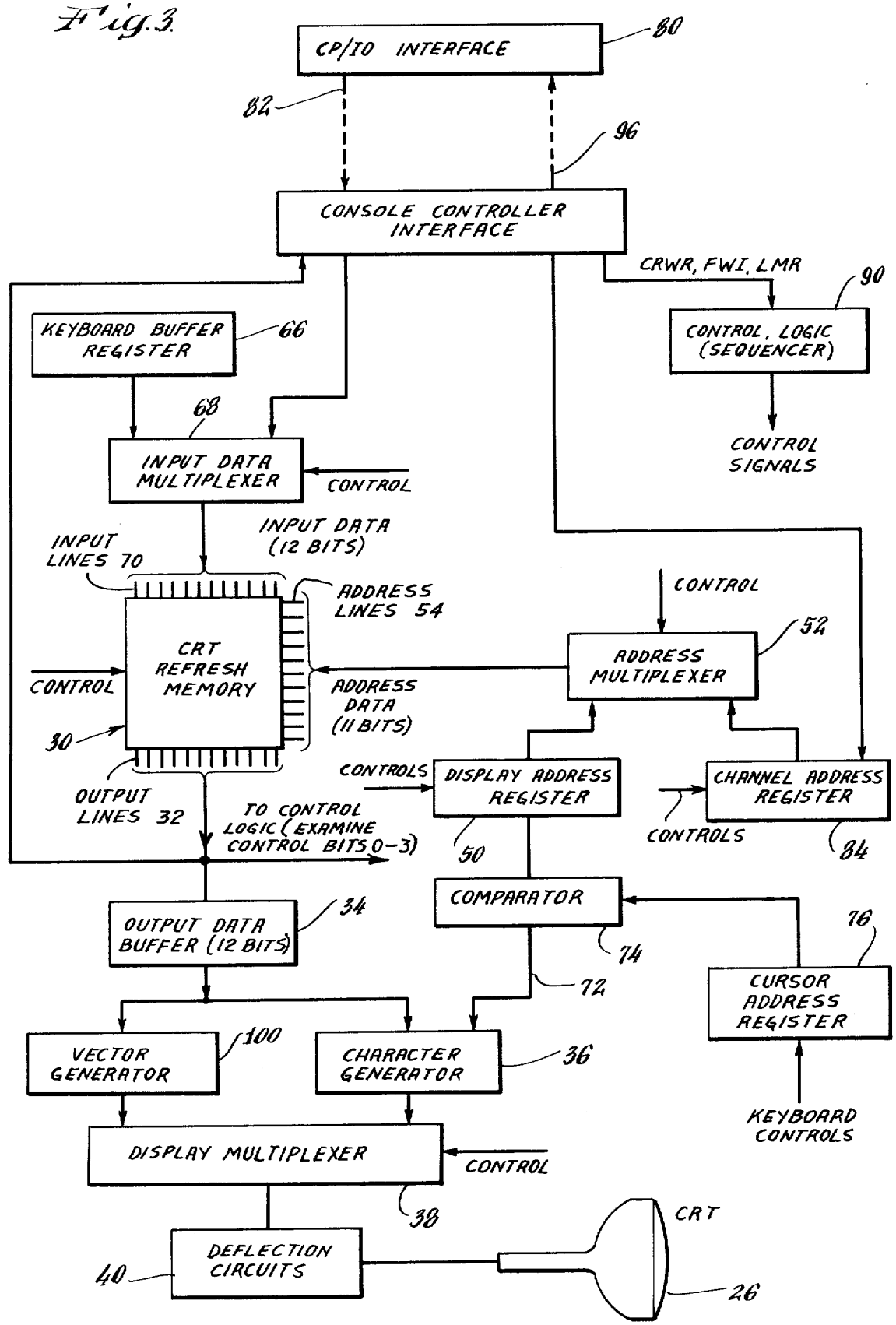

Fig. 7.

| | BLOCK ID | VARIABLE | LOW | HIGH |
|---|---|---|---|---|
| RECORDER 1 | | | | |
| PEN 1 | ------ | -- | ------ | ---- |
| PEN 2 | ------ | -- | ------ | ---- |
| PEN 3 | ------ | -- | ------ | ---- |
| RECORDER 2 | | | | |
| PEN 1 | ------ | -- | ------ | ---- |
| PEN 2 | ------ | -- | ------ | ---- |
| PEN 3 | ------ | -- | ------ | ---- |

VARIABLES

1 = SETPT     2 = INPUT 1
3 = CONTROL BLOCK MEAS. INPUT     4 = INPUT 3
5 = INPUT 3     6 = SCAN BLOCK MEAS.
7 = BLOCK INPUT

Fig. 8.

SELECT PROCESS UNIT

SDI STANDARD MEASUREMENT DISPLAY REACTOR PREHEAT CONTROL, TEMP & FLOW

SPI PROCESS DISPLAY FOR C4ØØ1Ø

SBØ SPECIAL BLOCK DISPLAY

CB1 CONTROL BLOCK M4ØØ32

CB2 CONTROL BLOCK N4ØØ34

ENTER ID ___

Fig. 12.

LOOP OR BLOCK DISPLAY REQUEST

LOOP OR BLOCK ID ___         DISPLAY TYPE ___

| TYPE NO. | DISPLAY DESCRIPTION |
|---|---|
| 1 | BASIC FORMAT |
| 2 | |
| 3 | BAM PROCESS OPERATORS DISPLAY |
| 4 | BAM INITIATING DISPLAY |
| 5 | TREND RECORDER |
| 6 | TREND DISPLAY |

Fig. 9.

PROCESS UNIT DISPLAY
PROCESS DISPLAY 17 STRIP COL.                                   DATE: 11-30-71  TIME: 1100
LOOPID BLOCK INPUT  MEAS. UNITS  SETPT  OUTPUT CTL MODE SCN INALRM  BLALRM
M200 C200 F200  1200. PPH   1100.  -----  ON   ON

R201 C101  100.
       C101 F100  N/A                                       ON  ABS LO

C204 F204  215. PPH  205.   -----
M201 C201 T201  D116. C     115.   -----              OFF
       C210 F201  1420. PPH 1415.
M202 C202 F202  36.5 PSI                                               *ABS LO
M203 C203 L203  45.  IN
       C103 F203  3205. PPH                                                *DEV LO
M204 C204 F204  910. PPH

Fig. 10.
| SYMBOL | MEANING |
|---|---|
| 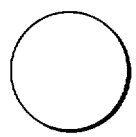 | PRESS INDICATED FUNCTION KEY (NAME OF KEY IS INSIDE CIRCLE) |
| 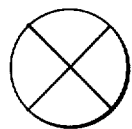 | PRESS INDICATED FK WITH ACCESS KEY AT "ON" |
| 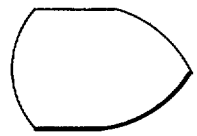 | POSITION CURSOR AND/OR KEY IN DATA |
| 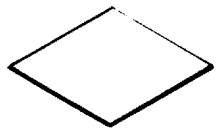 | OPERATOR DECISION |
|  | CONSOLE (CRT) RESPONSE |
| 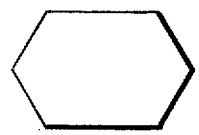 | PREVIOUSLY DEFINED PROCEDURE |

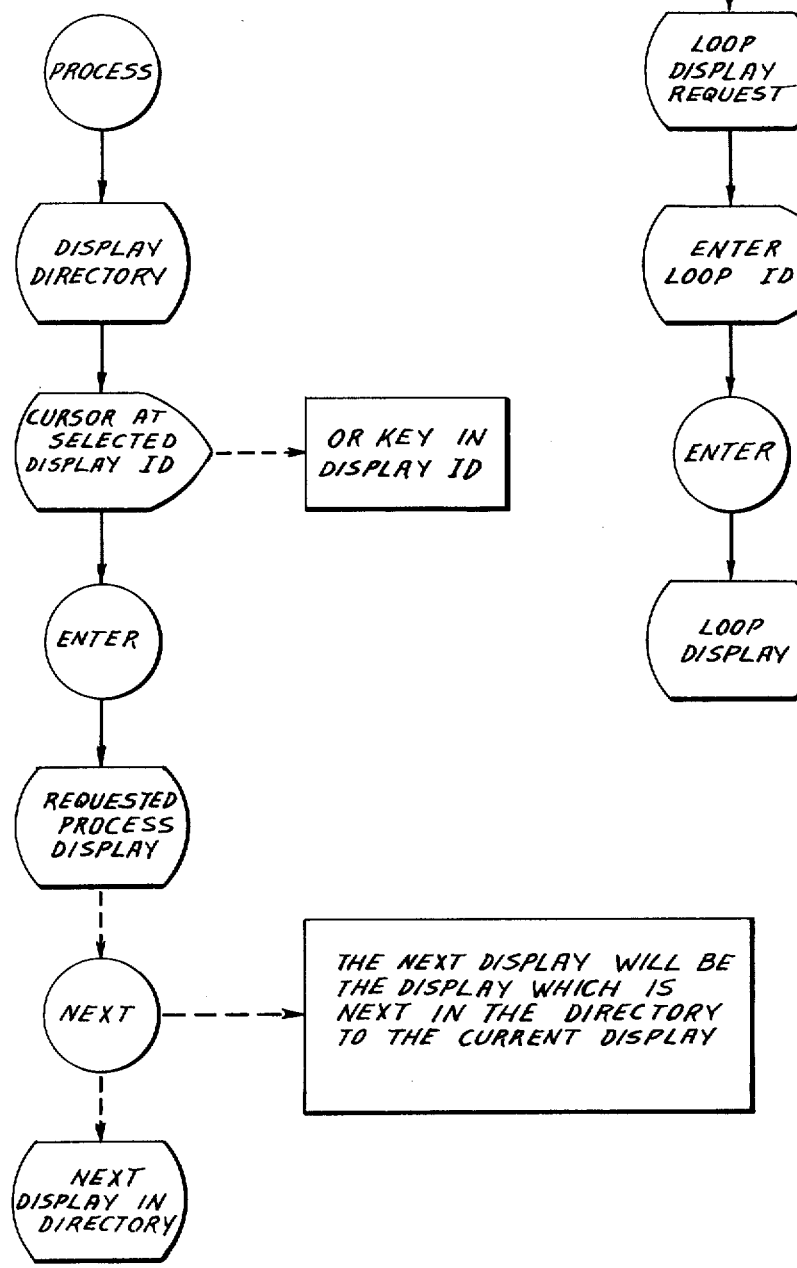

LOOP DISPLAY: M 200    DATE: 12-29-71  TIME: 1130

| BLOCK | TYPE | INPUT | MEAS | UNITS | SETPT | OUTPUT | CTL | MODE | SCN | INALRM | BLALRM |
|---|---|---|---|---|---|---|---|---|---|---|---|
| C 200 | PID | | 200.0 | PPH | 185.0 | --- | --- | | ON | DDC | |
| R 201 | RATIO | | 100.0 | PPH | | .55 | --- | --- | ON | DDC | |
| C 101 | D/T | | 104.0 | PPH | N/A | | | | BYP | DDC | |
| C 100 | L/L | | 106.0 | PPH | N/A | | | | ON | DDC | |
| C 204 | PID | | 110.0 | PPH | 115.0 | AUTO | | | OFF | BKUP | |

LOOP DIAGRAM:

Fig. 18a

**\*\* BAM INITIATING DISPLAY \*\***

BEGIN NEW(N) OR CONTINUE OLD (C) OPERATION: ___
IF CONTINUE, THE FOLLOWING CAN BE LEFT BLANK

BAM OPERATION: ADD (A), OTHER (O): ___   BLOCK ID FOR OTHER OPERATION: ___

FOR ADDED BLOCKS, SPECIFY EITHER AN EXISTING BLOCK ID "JUST LIKE" THE
BLOCK TO BE ADDED OR SPECIFY THE BLOCK TYPE INDEX AND ALGORITHM NUMBER
FOR THE ADDED BLOCK

JUST LIKE BLOCK ID: ___
BLOCK TYPE: ___   ALGORITHM NUMBER ___

| SCAN (1) | COMPUTATION (2) | | CONTROL (3) | ACTION (4) | FANOUT (5) |
|---|---|---|---|---|---|
| SQRT (1) | LLNRE (1) | DTM (9) | PID 1 (1) | USER (1) | |
| LIN (2) | M/2 (2) | USER (10) | PID 2 (2) | USER (2) | |
| QUAD (3) | MAVG (3) | USER (11) | RATIO (3) | USER (3) | |
| 3RD (4) | OSUM (4) | | BIAS (4) | | |
| STD (5) | AFILT (5) | | SPC (5) | | |
| USER (6) | PAR (6) | | USER (6) | | |
| | LLNMS (7) | | BB (7) | | |
| | DTR (8) | | | | |

\* INITIATE BAM    \* NEXT              BAM DIAGNOSTIC

Fig. 18b-1.

BAM ENGINEERS DISPLAY

IDENTIFICATION

BLOCK TYPE (BTYPE) = ___   BLOCK ID (BNAME) = _____   LOOP ID (BLOPID) = _____
PROC. INTERVAL (BFREQ) = ___   PHASE (BFAZE) = ___   FORMAT INDEX (BFORM) = ___
DESCRIPTION (BMESG) = _____   SAME AS BLOCK (BDUP) = _____
ENG. UNITS (BUNIT) = _____   BLOCK ACTIVE (BACT) = ___
RECORD POSITION : GROUP (BGRUP) = ___   POSITION (BPOS) = ___
INPUT TYPE (MTYP) = ___

REAL TIME INPUT : COUNTS (MRAW) = _____   MEAS (MEAS) = _____

*MODIFY  *ADD  *DELETE  *SAVE  *NEXT/PAGE  *LAST/PAGE  *HARDCOPY  *SIMULATE
BAM DIAGNOSTIC OR ACKNOWLEDGEMENT

Fig. 18b-2

**\*\* BAM ENGINEERS DISPLAY \*\***

INPUT INFORMATION
MPLXR OR ICW ADDRESS (MINP) = _____  GAIN CODE (MGAIN) = _____  MPLXR NEST (MNEST) = _____
MPLXR CARD (MUX) = _____  OVERRANGE ALLOWANCE CODE (MRANG) = _____
THERMOCOUPLE TYPE (MTC) = _____  REF JUNCT NO. (MREF) = _____
OPEN CIRCUIT DETECTION (MOCD) = _____  THERMOCOUPLE BIAS (MBIAS) = _____

CONVERSION INFORMATION
LINEAR TYPE (MFUNC) = _____  OUTPUT TO ICW (BOTI) = _____  DIGITAL FILTER (MFILT) = _____
DIGITAL FILTER CONSTANTS: F1(MF1) = _____  F2 (MF2) = _____
CONSTANTS: KA (MKA) = _____  KB (MKB) = _____  KC (MKC) = _____  KD (MKD) = _____

REALTIME INPUT: COUNTS (MRAW) = _____  MEAS (MEAS) = _____
\* MODIFY  \* ADD  \* DELETE  \* SAVE  \* NEXT/PAGE  \* LAST/PAGE  \* HARD COPY  \* SIMULATE
BAM DIAGNOSTIC OR ACKNOWLEDGEMENT

Fig.18b-3

BAM ENGINEERS DISPLAY

ALARM INFORMATION

SUPPRESS ALARMS (BSUPP) = _____  CONS SELECT(BCONS) = _____  TYPER SELECT(BCTYP) = _____

ALARM KEY NO. (BLITE) = _____

HIGH ALARM LIM(MALHI) = _____  LOW ALARM LIM(MALLO) = _____

RATE OF CHANGE LIM(MRLIM) = _____  ALARM DEADBAND (MALDB) = _____

DISCONNECT ON RANGE VIOL(MIQR) = _____  DISCONNECT ON ALARM LIMIT VIOL(MALQ) = _____

REAL TIME INPUT: COUNTS(MRAW) = _____  MEAS (MEAS) = _____

*MODIFY  *ADD  *DELETE  *SAVE  *NEXT/PAGE  *LAST/PAGE  *HARD COPY  *SIMULATE

BAM DIAGNOSTIC OR ACKNOWLEDGEMENT

COMPUTER-DIRECTED PROCESS CONTROL SYSTEM WITH INTERACTIVE DISPLAY FUNCTIONS

This is a continuation, of application Ser. No. 481,180 filed on June 20, 1974, which in turn is a continuation of Ser. No. 419,444 filed Nov. 27, 1973 which in turn is a continuation of Ser. No. 229,077 filed Feb. 24, 1972.

BACKGROUND OF THE INVENTION

1. Field of the Invention

This invention relates to industrial process control systems of the type including a central processor which functions in a time-share mode to make calculations respecting a large number of variables, such as process conditions, and to produce corresponding information or command signals for a variety of purposes such as positioning process valves or the like. More particularly, this invention relates to such systems having visual display means for presenting to the process operator or process engineer intelligible information to aid such personnel in exercising control over the process.

2. Description of the Prior Art

Computer-operated control systems have been in use for a number of years with various kinds of industrial processes. Such systems generally provide some form of visual data display to aid the process operating personnel, although for the most part the data displays have been relatively rudimentary and only suitable for limited purposes. Experience with such equipment has demonstrated that the process operating personnel require substantially improved facilities for communicating with the control system in order to exercise the desired close and effective control over a process. There have been a number of proposals to provide elaborate data displays with quite large display capacities, such as large-screen CRT devices. However, for various reasons such apparatus provided or proposed heretofore has not satisfactorily solved the problem.

BRIEF DESCRIPTION OF THE PREFERRED EMBODIMENT

The computer control system to be described hereinbelow includes an operator's console uniquely designed for use by process operators and engineers. It enables communication with the process and permits rapid and convenient access to information about the process, as well as changes to the control system. The console configuration includes a CRT display, a multi-function keyboard, alarm keys, and may include a trend recorder and a printer. Character positions on the CRT can be identified by a cursor which may be moved to any location on the display by manual controls on the keyboard or by the central processor. The cursor does not displace characters. It is used to point to a location for keyboard modification or program use.

The CRT console permits simultaneous display of related process information. Operator-process interaction can take the form of single or multiple entries onto blank(s) or changeable portions of a display. The console provides a parallel, conversational medium with instructional aids and directory displays.

Inherent in the console system design is the concept of local and computer interaction. That is, an operator may change, write over, or insert characters in unprotected areas of a display without requiring computer servicing and without changing computer memory. The computer is involved as necessary to spend or receive information. Call sequences for displays are designed to permit ease of going from overall summarizing formats to in-depth presentations of a small sector of the control net-work.

All functions and procedures are oriented to a process operator or process engineer. Information is presented in formats appropriate to the process. Operator console functions are designed to be self explanatory, in terms of purpose and procedure. No knowledge of system operation, software structure, or program languages is required to use the console.

Accordingly, it is a principal object of the invention to provide superior industrial process control apparatus of the type having data display means. Another principal object of this invention is to provide improved methods and techniques wherein image display means may be used to significantly enhance a process operator's capacity to control an industrial process and to perform related functions.

Other objects, aspects and advantages of the invention will in part be pointed out in, and in part apparent from, the following description considered together with the accompanying drawings, in which:

FIG. 2a is a front perspective view of a CRT console for the system of FIG. 1, and FIG. 2b is an enlarged portion of FIG. 2a showing the alarm keys;

FIG. 3 is a schematic block diagram showing the principal components of the CRT display system;

FIG. 4 is a pictorial illustration of the refresh memory for the CRT display;

FIG. 7 is a pictorial showing of one possible CRT display;

FIG. 8 illustrates a process unit directory display;

FIG. 9 illustrates a process unit display selectable from the display of FIG. 8;

FIG. 10 is a chart to explain certain symbols used in flow diagrams;

FIG. 11 is a procedural flow diagram for the selection of a process unit display;

FIG. 12 is a loop and block display request form;

FIG. 15 is a procedural flow diagram for selecting a loop or block display;

FIG. 18a and 18b and 1–3 show additional CRT displays; and

DETAILED DESCRIPTION OF THE PREFERRED EMBODIMENT

Figure 1:
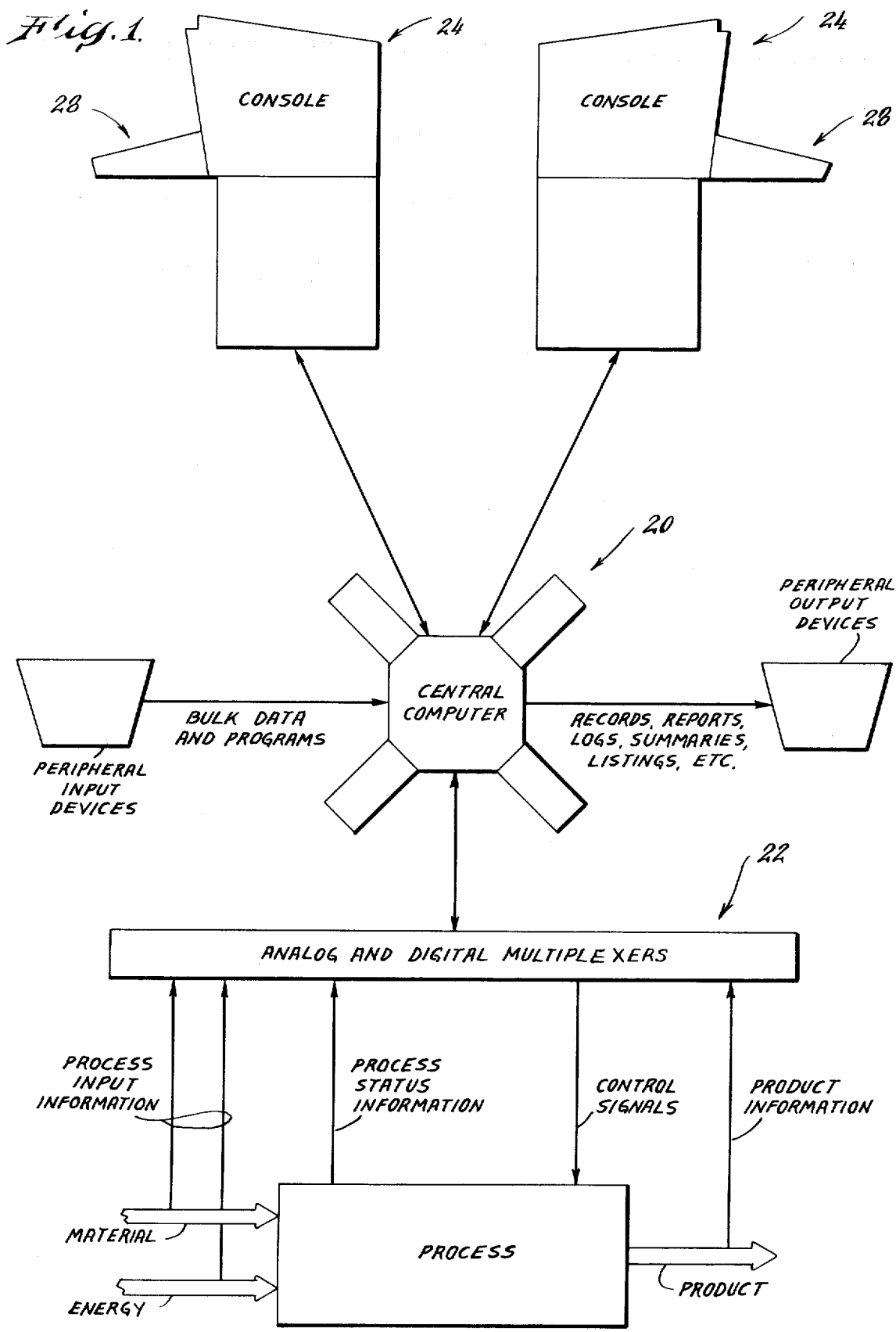
FIG. 1 is a schematic block diagram of a process control system.

Referring now to FIG. 1, the process control system comprises a central-processing input/output (CP/10) unit 20 in the form of a high-speed digital computer of the general purpose, stored-program type, organized in a timeshare configuration to perform calculations respecting a large number of input signals. The system is more fully described in U.S. Pat. 3,800,288 which has been issued to Russell et al. One group of such input signals is derived from an input multiplexing system 22 arranged to present to the processor a series of measurement signals representing the magnitudes of respective process conditions. In response to such inputs, the processor develops corresponding information or command signals which are directed to various operating elements such as process valves and the like.

The control system also includes one or more operator's consoles 24 (see also FIG. 2a) each of which incorporates a large-screen CRT display device 26 arranged to present alphanumeric characters and other graphic data, including for example, diagrammatic configurations as will be described. The console includes a multi-function keyboard 28 which enables the operator to call up a variety of special displays, and to effectively exercise close control over many aspects of the system. Such console displays can provide continually updated images of total plant functioning, e.g., in terms of raw material inflow and product outflow. The displays may also focus on a process sub-system, individual process unit, control loop, functional block within a loop, or even selected variables. The displays are formatted to provide information as well as to guide the operator in directing the control action of the system. The displays include fill-in-the-blank formats which cooperatively function together with computer software processing to provide the operator with powerful and effective tools for manipulating the process.

Referring now to FIG. 3, the display of the CRT 26 is basically controlled by a conventional refresh memory 30 containing binary data words which define the characters (and other graphic images) to be produced on the screen of the CRT. The stored data words are periodically and sequentially read out through the output lines 32 to an output data buffer 34 which supplies the signals to a character generator 36 (when alphanumeric characters are to be displayed). This character generator produces CRT control signals which are directed through a display multiplexer 38 to the deflection circuits 40 for the CRT 26. The deflection circuits perform digital to analog conversion and operate in the usual fashion to form the display characters on the screen of the CRT.

Although various types of memories could be used, it is preferred to employ a dynamic memory of the semiconductor type. Access to the stored data can be obtained rapidly and at random, by supplying appropriate addressing codes to the memory address lines. Such memory devices require separate Write and Read control signals, which can readily be developed by associated logic controls.

The refresh memory 30 has a capacity to store 2048 12-bit words, but because of system considerations only 2000 words ordinarily will be stored. When alphanumeric character words are stored in the memory, there is a one-to-one mapping relationship between the memory storage locations and the display locations on the face of the CRT. The CRT screen has a 12 inches × 15 inches usable display area, and is arranged to present 2000 alphanumeric characters in 25 lines of 80 characters each. The characters are 0.24 inches high by 0.12 inches wide.

Referring also to FIG. 4, which is a pictorial illustration of the separate storage bins of the refresh memory 30, it will be seen that each of the 2000 storage words contain 12 bits. The last 8 bits define the display character in standard ASCII code. The first 4 bits are for control purposes. Specifically: bits No. 0 and No. 1 together define the display mode as the either alphanumeric or vectorgraphic (to be discussed more fully hereinafter); bit No. 2 is the so-called protect bit, the function of which will be explained hereinbelow; and bit No. 3 determines whether the character is presented steadily or with periodic blinking.

The primary function of the refresh memory 30 is to periodically present to the CRT all of the stored character and/or symbol data, so as to refresh the visual display on its screen at a sufficiently high frequency to avoid flickering. This cyclic operation of the refresh memory occurs at the rate of 60 frames per second, and is controlled by a Display Address Register (DAR) 50 the address signals from which are directed through an address multiplexer 52 to the address lines 54 of the refresh memory. At the start of each frame, the DAR is set to its home or zero address, corresponding to the upper left-hand corner of the CRT display. Thereafter, the DAR is incremented periodically through the remaining 1999 addresses, to read out the associated data words from the memory as the frame time proceeds through its period (1/60 of a second, typically 16.67 milliseconds).

For each address read out from the DAR, there is a corresponding read-out cycle of the refresh memory 30. This operation is called a display-memory-cycle, or DMC, and takes about 1 microsecond. DMCs occur every 4 microseconds, except when the character to be displayed requires more than 4 microseconds of character generator time, in which case the DMCs will be separated by 8 microseconds.

The display memory cycles (DMCs) are interleaved, on a time scale, with other refresh memory cycles referred to as channel-memory-cycles, or CMCs. During these latter cycles, the refresh memory is read or written into in response to command signals from the CP/IO unit 20. This time-sharing of the refresh memory 30 is illustrated in the timing diagram of FIG. 5. The memory cycles DMC and CMC are initiated by corresponding request pulses referred to as display-memory-request (DMR) and the channel-memory-request (CMR), occurring in alternating fashion. Thus, after a DMC has been completed, and while the character generator is busy developing the CRT beam control signals, a CMC can be produced (if requested) to access any address in the refresh memory, to permit data to be written into the memory from the CP/IO unit or to permit data to be read out and transferred to the CP/IO unit.

The protect bit (No. 2) is of special significance in the console operation. When this bit is marked, i.e. a binary one, the associated character is termed a protected character. One feature of a protected character is that it cannot be altered inanyfashionbythekeyboard 28. Storage locations where the protect bit is a zero can be written into by the keyboard at the will of the operator.

Figure 6:
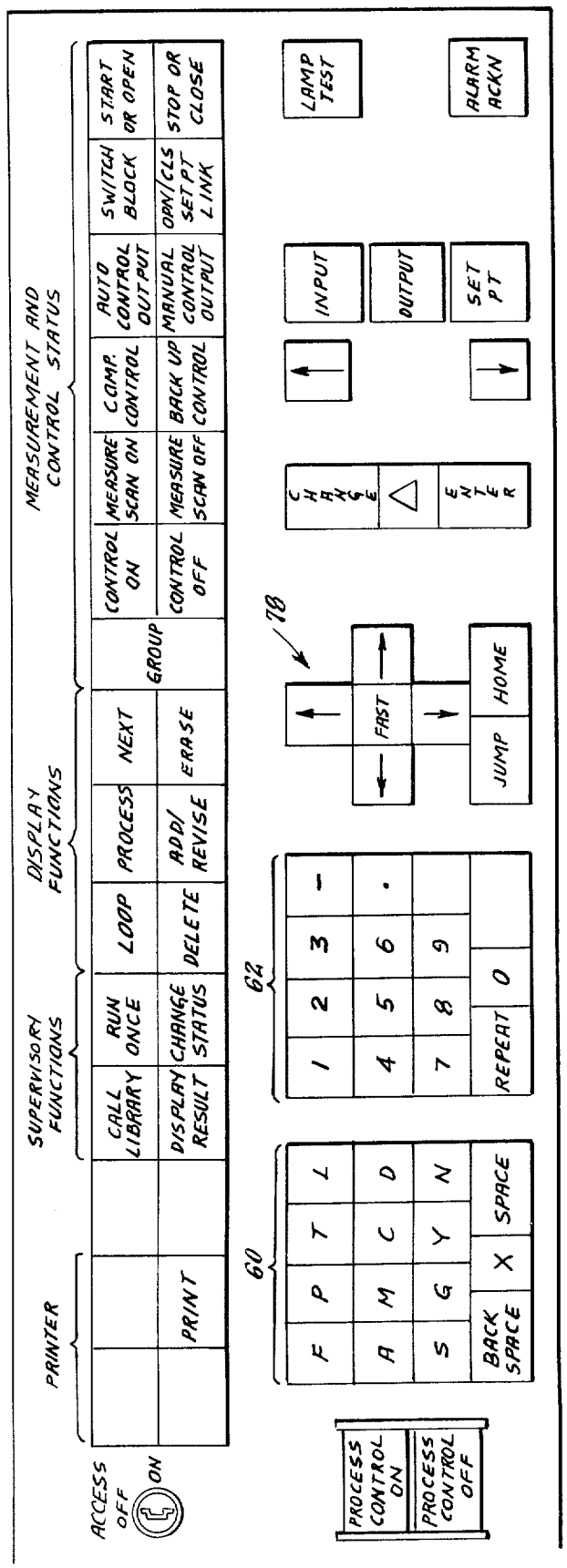
FIG. 6 shows a keyboard layout for the CRT display console.

The keyboard 28, outlined in detail in FIG. 6, includes a set of alphabetic keys 60 and a set of numeric keys 62. When the operator presses any one of these keys, a digital code word identifying the character is stored in a keyboard buffer register 66 (FIG. 3). This coded character is directed to an input data multiplexer 68 which transmits it onto the memory input lines 70 to be loaded into the refresh memory 30 at a specified word position, provided that such word position is unprotected. The loading operation takes place during a display memory cycle (DMC), referred to previously.

The word position to be loaded with the keyboard character is identifed on the face of the CRT screen by a movable cursor. Preferably, the cursor is in the form of a small triangular marker located immediately below the identified position. This cursor is produced by the character generator 36 together with any character which already occupies the marked storage position in the memory.

The character generator produces the locator cursor in response to a signal from an output line 72 of a comparator 74. This comparator compares the continuously changing output of the Display Address Register (DAR) 50 with the output of a Cursor Address Register (CUAR) 76 and, when the two are identical, sends a signal to the character generator to develop the cursor image at the CRT display position then identified by the address signals delivered to the memory address lines 54 by the DAR. The CUAR is controllable by special keys 78 on the keyboard, or by CP/IO interaction, so as to permit moving the cursor to any position on the screen.

Before the character in the keyboard buffer register 66 is loaded into the refresh memory 30, the character word already stored in the cursor-identified storage position is examined to determine whether its protect bit is a one or a zero. If a zero, the writing operation proceeds normally. If a one, the control logic circuitry is conditioned to prevent any writing into the memory device during the particular memory cycle (DMC) corresponding to the cursor position.

By these means, certain special words, symbols or numbers, etc., placed in the refresh memory 30 by the CP/IO unit, can be made immune to any alteration from the operatior's keyboard 28. For example, selected headings of columns in a tabular data display, or certain operating parameters of a control loop, can be made effectively permanent, so far as the process operator's console is concerned, and subject to modification only in accordance with strictly defined procedures established in the computer software which, in turn may cause the protect bit of a word in the refresh memory to be changed from a one to a zero.

Although the keyboard 28 can make limited local alterations to the data stored in the refresh memory 30, the display data is primarily controlled by the CP/IO unit 20. Data transfers between the CP/IO unit and the refresh memory, in either direction, take place through a data bus arrangement referred to as Channel Input-/Output, or CIO. The transfer operation is initiated at the CP/IO Interface 80 (FIG. 3) which sends through leads 82 a set of control signals specifying details of the transfer. The ensuing data transfers are transmitted from the CP/IO Interface to the Console Controller Interface via lines 82, or from the Console Controller Interface to the CP/IO Interface via lines 96.

Figure 5:
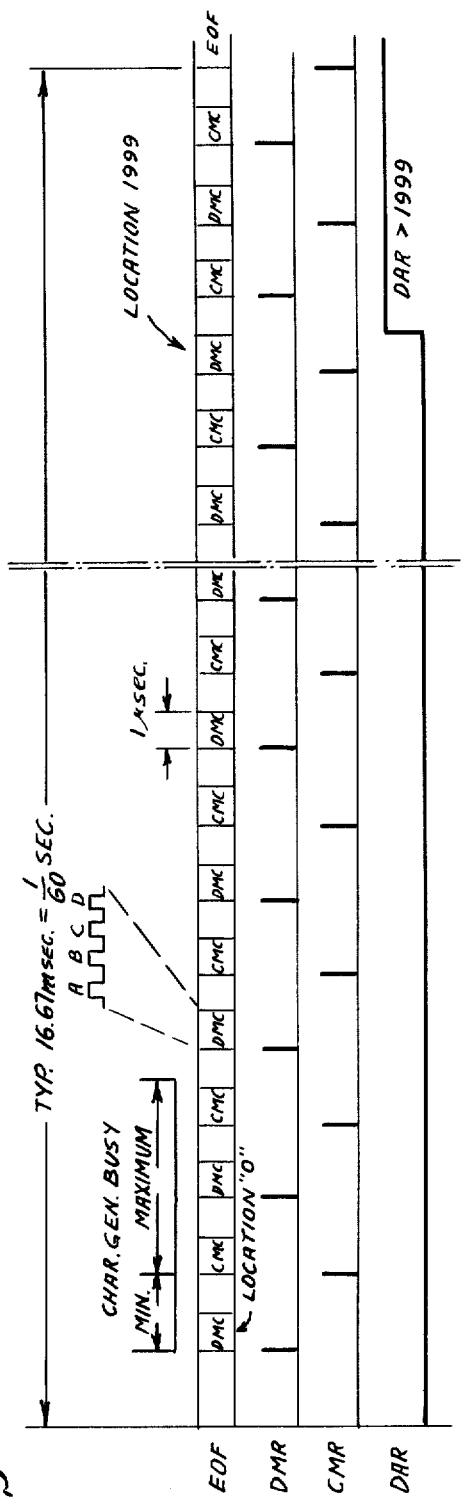
FIG. 5 is a timing diagram showing the time relationship between the different display functions.

In one embodiment, the control signals were for convenience arranged in two standarized-format, serially-transmitted 12-bit words. The first word contained one bit specifying whether the upcoming transfer was to be of the protected or non-protected type. Another bit of the first word specified the Read or Write mode, i.e., indicating whether there was to be a transfer from the refresh memory 30 to the CP/IO unit 20, or a transfer from the CP/IO unit to the refresh memory. The second word contained the starting address of the refresh memory for the transfer, this address being loaded into a Channel Address Register (CAR) 84 (FIG. 3) the output of which is directed to the Memory Address Multiplexer 52 (FIG. 18). As indicated in FIG. 5, this multiplexer time-shares the refresh memory between the Channel Address Register and the Display Address Register 50. The Channel Address Register is incremented by suitable controls to identify successive memory addresses as the transfer operation proceeds after all the control information has been loaded and processed.

The control signals delivered by the Interface 80 are analyzed by logic circuitry in the Console Control Logic Circuitry 90, which includes means for examining specified bit locations of the control words. When the control word is found to specify an unprotected transfer, data is transferred from (or into) each successive memory location identified by the Channel Address Register 84, regardless of whether the words already stored in such locations contain a marked protect bit or not. If a protected transfer is indicated by the control word, data is transferred from (or into) only those storage locations which have unmarked (zero) protect bits. That is, the transfer operation will skip over all protected locations in the specified address field, and will operate only on the unprotected locations, in the sequence in which they are encountered.

Display characters typically are transferred to the refresh memory 30 after the two control words have been processed. The data transferred from the CP/IO unit may provide an entire new display, i.e., the procedure may include erasure of all previous characters and insertion of a complete new set of characters, or writing over some existing characters. In many cases, the new data from the CP/IO unit will represent a response to some action taken by the operator at the console. Any of the characters transferred from the CP/IO may be either protected or unprotected. That is, the protect bit delivered by the computer with each set of character bits may be either marked or unmarked. This decision is made by the CP/IO software in developing each new display.

FIG. 7 illustrates one type of display which might be developed by the CP/IO unit 20 in response to signals from the operator's console. This display is a Trend Pen Assignment form which is used to assign specific recorder pens to corresponding variables. The underscore blanks are unprotected, but all other spaces are protected.

To facilitate entry of alphanumeric characters into the unprotected underscore positions, the CRT control circuitry is provided with the capability of automatically moving the cursor to the first unprotected location following a protected location. To put this procedure into effect, the operator first presses a key titled Home (FIG. 6). This key activates circuitry operable, in conventional fashion, to return the CUAR 76 to its zero count condition, thereby moving the cursor to the upper left-hand corner of the CRT display area. Then the operator presses a key called Jump which activates special control circuitry for incrementing the CUAR and, at each position, testing for the protect bit of the corresponding word in the refresh memory. At the first unprotected word position, following a protected position, the CUAR incrementing stops, and the cursor is properly located to aid the operator in inserting data in the unprotected location. The Jump key can be used again, with the same display, after selected entries have been made, in order quickly to locate the next place for a keyboard entry to an unprotected location.

After the selected unprotected character locations have been written, the Enter key is activated to indicate to the CP/IO unit that the new data is available. The CP/IO unit will then send back a retrieval command to obtain the newly entered data from the unprotected locations. That is, the first control word will contain a marked bit in one position to indicate a protected transfer, and a marked bit in another location to indicate Read mode.

The retrieval starting address identifed in the second control word can be the initial (zero) address of the refresh memory 30. The read-out operation, however, will be limited to the data stored in the unprotected locations. That is, the CHAR will quickly sequence through all of the protected locations, while the control logic examines the character control bits and inhibits any read-out from those locations having marked protect bits. At the first unprotected location, the read-out operation will take place from the output of the memory to the Console Controller Interface and thence through leads 96 to the CP/IO unit.

To review: Keyboard data is entered in the refresh memory 30 during a Display Memory Cycle (DMC). One word of data is entered during a refresh memory cycle (1/60 of a second) at the location indicated by the cursor, if a keyboard alphanumeric key is depressed. The refresh memory has a specific bit (data bit No. 2) assigned in each character word which indicates whether the character is protected or unprotected. If the character is protected, it cannot be erased or disturbed in any way from the keyboard. The only way the character can be changed is from the CP/IO unit 20, via the channel input-output (CIO) bus (or another bus, not shown, assigned specifically to control functions). The CIO transfer has two modes of operation, one which recognizes the protected characters and will only read or write into unprotected locations, and another which disregards the protected characters and will read or write into any specified location or series of locations. One bit of the channel control-word specifies the channel mode.

A vector generator unit 100 (FIG. 3) is provided to develop a variety of display images comprising a series of connected vectors. This unit accepts a successive pair of 12-bit data words from the refresh memory output data buffer 34. The vector generator decodes the two data words to identify the vector as a relative or absolute vector and starts the appropriate initialization procedure for vector generation. Upon completion of the initialization routine, this unit accepts control of the CRT deflection circuits and supplies the necessary control signals to generate the required vector.

Vector data word pairs are identified by the first two bits of the first 12-bit word. When these bits are 10, a relative vector is identified, whereas 11 identifies an absolute vector, i.e., an absolute vector is one whose starting and ending X, Y coordinates are referenced to some fixed position on the display (typically the lower left-hand corner), as compared to a relative vector the coordinates of which are specified with respect to the current beam position. The remaining ten bits of the first word specify the X coordinate deflection to be effected. The first two bits of the second word provide a control of the line type: dotted, dashed, solid, or blanked. The remaining ten bits of the second word specify the Y coordinate deflection to be effected.

DISPLAY FEATURES

Before describing details of specific types of displays presented on the CRT, and the ways in which the operator can interact with such displays, several basic terms used in the art of process control will first be defined:

Block:

A block is the fundamental unit of control. It consists of a program function which performs scan, computation, or control. A typical control block is PID (Proportional-Integral-Derivative).

Loop:

A loop consists of several blocks connected together, either one-to-one (cascade) or one-to-several (fanout). A loop can perform all the functions necessary to control one step in a process. The programming to connect and implement loops is provided by the software in the central processor.

Network:

A network contains all the loops which together control a process from beginning to end.

Process Unit:

A process unit may be co-extensive with a network, or it may be a collection of loops and blocks in some other configuration which is meaningful to plant personnel. For example, a process unit display could be an inventory list, a table of flows, a statistical table, or a graphic chart.

The process operating personnel can call up to the CRT a wide variety of different displays containing live process-related information. Such displays can show selected data groupings describing details of a process unit, or details of a loop or a block. Typically, the call-up of such displays is initiated by the operator pressing either the Process key (for process unit displays) or the Loop key (for loop or block displays).

Upon pressing the Process key, an interrupt signal is directed to the CP/IO unit which, in the usual mode of operation, takes the appropriate information signal from the console representing closure of the Process key switches, analyzes that signal and prepares a response in accordance with the programming sequences established in the processor software. Specifically, in response to the Process key entry, the CP/IO unit transfers to the refresh memory 30 data words for a Process-Unit Display Directory, such as illustrated in FIG. 8.

From this directory, the operator selects a specific process unit display for viewing on the CRT. To call up the selected process unit display, the operator uses the alphanumeric keys to insert the appropriate display Identification No. (ID) into a data entry slot at the bottom of the display. Pressing the Enter key signals the CP/IO unit the the ID number has been inserted, and that unit thereupon initiates a data retrieval sequence to transfer the ID number back to the central processor. This data retrieval operation is part of the programmed sequences stored in the computer memory. For example, all of the display positions except the entry slot could be previously established as protected (as discussed above), and the data retrieval operation programmed at the CP/IO unit responsive to the Enter signal could be that of retrieving the data from unprotected locations. Thus, the requested ID number can quickly be determined.

At the CP/IO unit, the retrieved ID number is used to select from the main memory storage the set of display data words defining the selected process unit display. This can readily be accomplished by known programming procedures. The CP/IO unit thereupon transfers these display data words to the refresh memory 30, to take the place of the directory display.

Alternatively, to select a particular process unit display from the directory, the system could be arranged so that the operator simply positions the cursor at the display ID in the directory, and then presses the Enter key. The CP/IO unit software would automatically carry out the necessary sequences to retrieve the location of the cursor, by a data transfer instruction to the console, and thereby determine the identity of the selected display by reference to its own stored data for the directory display. The CP/IO thereafter carries out the sequences necessary to transfer the selected display data words to the refresh memory.

FIG. 9 illustrates one type of process unit display which might be selected from the Process Unit Display Directory. After such a process unit display has been presented on the CRT, pressing the Next key will bring to the screen the next display in the sequence; if the current display is the last one in the Directory, pressing Next will bring up the first display in the Directory. The interactive processing functions carried out in selecting a process unit display are set forth in the flow diagram of FIG. 11. (Note: The symbols used in the flow diagrams are explained in FIG. 10.)

To obtain either a loop or a block display, the operator first presses the Loop key. This transmits a signal directly to the CP/IO unit which analyzes the signal, identifies it as one caused by closure of the Loop key, and activates the processor software to transfer to the refresh memory 30 character words which present on the screen a Loop or Block Display Request form such as illustrated in FIG. 12. The operator keys in the loop or block ID in the indicated underscore blank, also keys in the display type 1, and pushes the Enter key.

Figure 13:
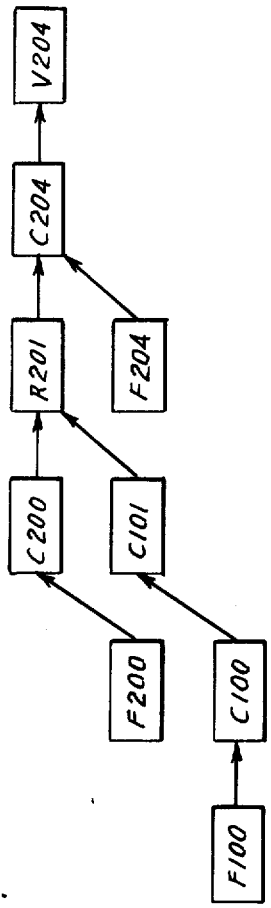
FIG. 13 shows a typical loop display.
Figure 14:
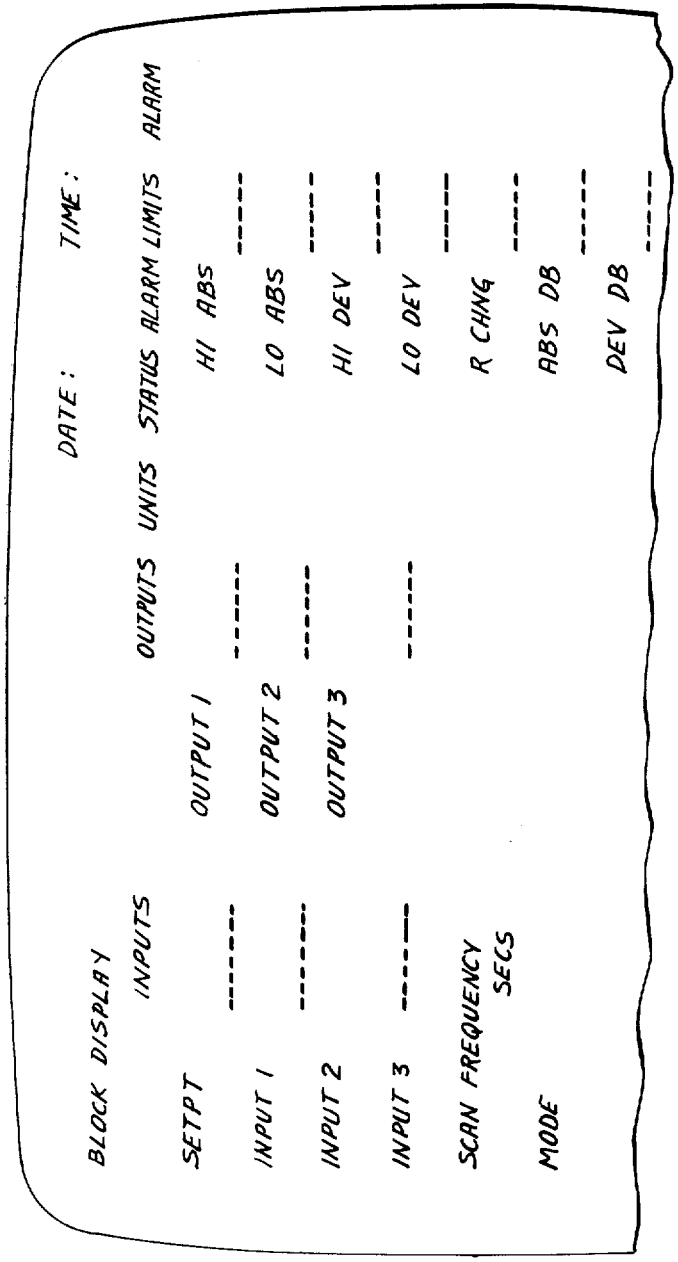
FIG. 14 shows a typical block display.

This sends a control signal to the CP/IO unit which automatically responds, as a consequence of its own programming, by sending to the console a data transfer instruction requesting retrieval of the keyed-in loop ID data from the memory 30. The CP/IO unit then locates in its own memory the display data words corresponding to the selected loop display ID retrieved from the console. These display data words are sent back to the refresh memory, replacing the directory display, and the selected loop display then will automatically appear on the screen. FIGS. 13 and 14 illustrate loop and back displays of the type which might be selected for presentation on the CRT. FIG. 15 sets forth, in flow diagram format, the program-interactive procedural steps of obtaining loop or block displays.

A loop display contains information about the loop structure, block status, and the process variables involved. The lower part of the screen contains the loop diagram. The loop diagram shows the connections between all blocks comprising the loop. Each block is connected by a line to the block receiving its output value. Control blocks are linked horizontally and their input source(s) appear directly to the left or below them to the left. When a block is inactive or a link opened, the connecting line becomes dashed. The control block in the loop which outputs to a valve or control station is connected to the control station designation.

A block display contains information about one functional block. Parameters will only be filled-in if they are revelant to the type of block on display (e.g., control block displays will have SETPT and deviation alarm limit entries, while scan and computational blocks have INPUT1 and no deviation alarm limits). The block display can be modified in format or content without programming. Any of the parameters in a block which are relevant to all the algorithms (e.g. PID, RTIO) of that block type (e.g. SCAN, COMP) can be included.

Referring again to FIG. 9, the maxiumum number of lines of data in a process unit display is eleven, allowing for space between these lines to enter new values in the underscore regions. The LOOP column in the display contains the ID for each loop in the display. The BLOCK column lists each control and computational block contained in the loop designated in the first column, directly to the left. The INPUT column contains the ID of the block which provides the input to the block.

Any of the block's real time variables, e.g., block active status, measurement, setpoint, output, and alarm status, are displayed in real time. They are continuously updated at the sample interval of the scan or control block.

If the measurement is off scan, a new value may be inserted through the console keyboard to replace the existing value. The new value is inserted in the underscore region, directly beneath the value to be replaced, and the Enter key pressed to transfer the proposed new data to the processor. If the new data is acceptable, the processor carries out a series of transfer operations to the console, to store the new values in the refresh memory locations where previously the existing values were stored. Thus, the new values appear in the main line. The processor also reinstates the underscores which were erased at the time of entry of the new values. New values can also be inserted in loop or block displays, in like fashion.

The measurement column in the process unit display is followed by a column containing an engineering units symbol. An engineering units value will appear in the SET PT column only if the block named is a control block. The OUTPUT column will contain the last output of the block named in the BLOCK column. In the case of operator supplied outputs for a block in manual, this will contain the last operator supplied output. If the output is velocity mode, such as delta-valve-position DDC outputs, then the delta value will be input and displayed in this column.

The CNTRL & MODE columns contain the control status of the block. The column under CNTRL contains the active/inactive status (ON, OFF) of a computerized or control block. If the block outputs to a control station, the computer/backup status of the hardware is represented by COMP or BKUP in the next (MODE) column. Also, a BYP is shown in this (MODE) column if the block is in bypass.

The last two columns contain the INPUT and OUTPUT blocks alarm states. If the block has more than one input, the alarm indication will appear if either input is in an absolute alarm. The words LO or HI appear for absolute alarm and DEV for a deviation alarm. The columns are left blank if no alarm exists.

Figure 16:
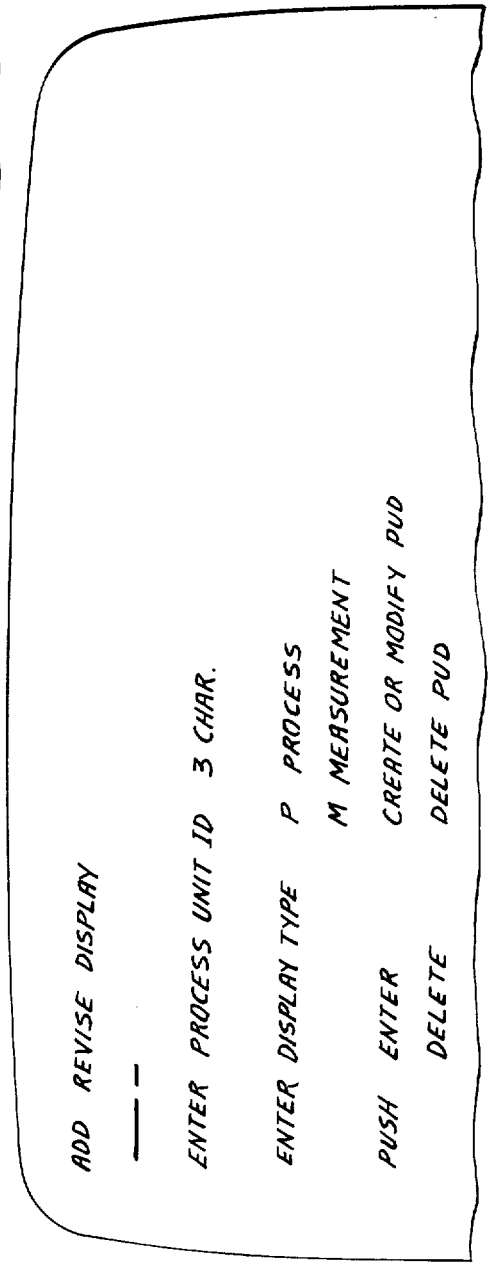
FIG. 16 shows an Add/Revise display form to permit changes to be made to displays from the operator's keyboard.

The ADD/REVISE key generates on the CRT screen an Add/Revise Display Request form such as illustrated in FIG. 16. Using this form, the operator may add, change, or delete particular process unit displays. The form will be completed in one of three ways for each of these functions.

To add a display, the operator will press ADD/REVISE, key in the 3-character display ID and 1-character display type (P for process unit), and press ENTER. If the selected ID has not been used previously an Add/Revise Response comes up on the screen. The new type and ID reappear on the screen, beside a blank to fill in a description and above a stack of blanks to defined the loop and block IDs that should henceforth be included in this new process unit display. The operator fills in the blanks and again presses ENTER. Any invalid (non-existing) loop or blocks IDs will be set to blinking. When all the entries are valid, the new process unit display is filed away. A message, PUD ACCEPTED, will be shown on line 25. The Add/Revise Request Form reappears.

To change a display, the operator must press ADD/REVISE, key in an old display ID and type, and press ENTER. The complete process unit display as previously defined is generated on the screen. The operator can then key over old entries. When he is satisfied with the alterations, he presses CHANGE. If the changes are valid, the message, PUD ACCEPTED, appears and the display reinitializes.

To delete a display, the operator presses ADD/REVISE keys in an old display ID and type, and then presses DELETE. If this display exists and is not protected, it is deleted. An acceptance message is displayed. If the display cannot be deleted, an error message is sent to the operator.

The CRT console keyboad 28 includes a number of additional keys which provide functions related to the process unit, loop and block displays. A brief description of those functions is given hereinbelow.

Control On/Off - The CONTROL ON/OFF keys will activate or deactivate the selected computational or control block. When control status changes, the display will reflect the change in two places. In the line containing the block data, under the CNTRL heading, the word ON or OFF will change to indicate the new state. The loop diagram in a loop display will show current state by a dashed (OFF) or solid (ON) connector between the ID of the selected control block and the ID of the block or valve it outputs to. The connector is dashed when the block is deactivated.

Measurement Scan On/Off - The MEAS SCAN ON/OFF keys will initiate or stop regular scan of a process measurement. When the block is put On or Off scan, the status change is reflected both in the SCN status in all the displays and in the loop diagram in loop displays. The loop diagram will show the current state by dashing or making a solid connector between the scan block and the block its measurement is being used by. While a point is off scan, a measurement value may be entered through the console, as described previously.

Computer/Backup Control - The COMP/BACKUP keys are used to switch control from the computer to the remote control station or back to computer control for a selected block. Only blocks which output to the process can be selected for this function. When this function is performed, the status change if reflected in the MODE column in the line of data.

Auto/Manual Control Output - These keys are used to enable the process operator to replace block outputs. The auto state permits block control and the manual state inhibits the block output without deactivating the control block. In the Manual output state, the operator may change the valve position for DDC blocks or setpoint for SPC blocks. The value output will be in the same form as the block output, i.e., outputs to devices which normally accept incremental outputs will be incremental. The output status is shown in the MODE column of a loop or process display as AUTO or MAN, and will reflect changes through the use of the AUTO/MANUAL FKs.

Switching Scan and Control Blocks - The SWITCH BLOCK key is used to change a loop configuration by selecting between two alternate blocks inputting to or output from a switch block. Bypass switching enables a control block to either output to the next downstream block, or bypass that block and output to the next downstream block, or bypass that block and output directly to the following block (or to the process). Before switching can be implemented, the cursor must be positioned under the switch block ID in the data portion of the loop display.

Opening and Closing Linkages - The OPEN/CLOSE LINK key enables the operator to open a cascade link between two control and computational blocks without deactivating the primary. In effect, the setpoint source is switched from the upstream control block to the operator's console, or vice versa. There are two purposes of this function; (1) to permit manual Set Point change without introducing an upset due to activation and initialization of upstream blocks, or (2) permit the operator to open/close a cascade without deactivating a primary which also provides a reference to other secondaries. A successful action is indicated by the open cascade having a dashed line. When the cascade is closed, the dash between the blocks is made solid.

Start, Open, Stop and Close-The START OR OPEN and STOP OR CLOSE keys are used to operate pumps, on/off valves, and motors. To perform the action, the operator positions the cursor at the equipment ID and pushes the desired key.

Group Action - The group key permits an operator to make a state change affecting all blocks performing the same kind of function which are contained in a process display or loop display. It applies only to the following functions:

A. CONTROL ON/OFF (control & computational blocks)
B. MEAS SCAN ON/OFF (scan blocks)
C. COMP/BACKUP (control blocks which output to process)
D. AUTO/MANUAL OUTPUT (control and computational blocks)

In general, any unprotected area on the CRT face can be written into. However, procedures for changing values are defined so that consistency and system security is maintained.

Entries are made either to change existing values or insert characters into an underscored, blank field. The number of underscore characters defines the length of the field. In order to provide verification of entries before changing a computer memory location, the console operating software prevents the user from overlaying any displayed characters except the underscore character. This means that fill-in-blank entries are made directly onto the underscore characters, which are unprotected. When the entry is made, the underscore disappears.

Data changes other than those made by the continuous change keys (which are not locally interactive) may be made by keying in the new value(s) and depressing the ENTER key. If the current value has beneath it a line of underscore characters the length of the data field, then the new value is entered overlaying the underscore characters. When the ENTER key is depressed, the new value overlays the old value and the underscore line below reappears. If a value can be changed but does not contain a line beneath it, then the new characters are keyed to overlay the existing ones.

As each character is keyed, the cursor automatically moves to the next character in the field. While the only way to enter new data is by keying it character-by-character, there are three ways to change displayed numerical values:

A. Numerical (absolute)
B. Single increment
C. Repeated increment (for changing setpoint, output and measurement only)

Methods A and B above are locally interactive; that is, they enable the operator to enter numerical values in as many locations as desired and verify them before depressing the ENTER key and causing the new values to replace existing data in computer memory. The numerical technique (Method A) is as described above, entering the replacement value in the line below the existing value. A single increment change (method B) is specified as a signed value. The sign (if increment is negative) and value is entered in the line below the current value. The increment key (labeled Δ) is depressed after the increment value is keyed in. When the key is pressed, any values in the data entry areas on the screen will be added to the existing values (if the final value does not violate constraints on the variable). The increment values remain in the data entry slots and another depression of the Δ key will cause another increment. The increment values can be cleared by depressing the ERASE key.

Repeated increments (method C) are used to make a Set Point, dummy measurement, or output appear to be continuously changing. This differs from methods A and B in that the value is repeatedly changed by increments in computer memory without requiring the use of the ENTER key. Before beginning the change, the cursor must be positioned under the first character of the block ID. The Set Point, INPUT or OUTPUT key is depressed to select the data field to be changed. These select keys are lit and remain lit until the ENTER key or another select key is depressed.

Depressing the ↓ or ↑ repeated increment key, located to the right of the CHANGE and ENTER keys, will move the cursor to the selected data field and begin to increase or decrease the value.

The initial value will drop to the line below and remain there, with the first character blinking for the duration of the display or until the operator erases or writes over it. Subsequent depression of the repeated increment keys will not reinitialize this value as long as the first character is blinking. The rate of change (size of increment) is dependent upon whether the arrow key is pushed to the first (slow) or second (fast) detent. While the key is held down, the value will be incremented at approximately 2.5 times/sec.

Figure 17:
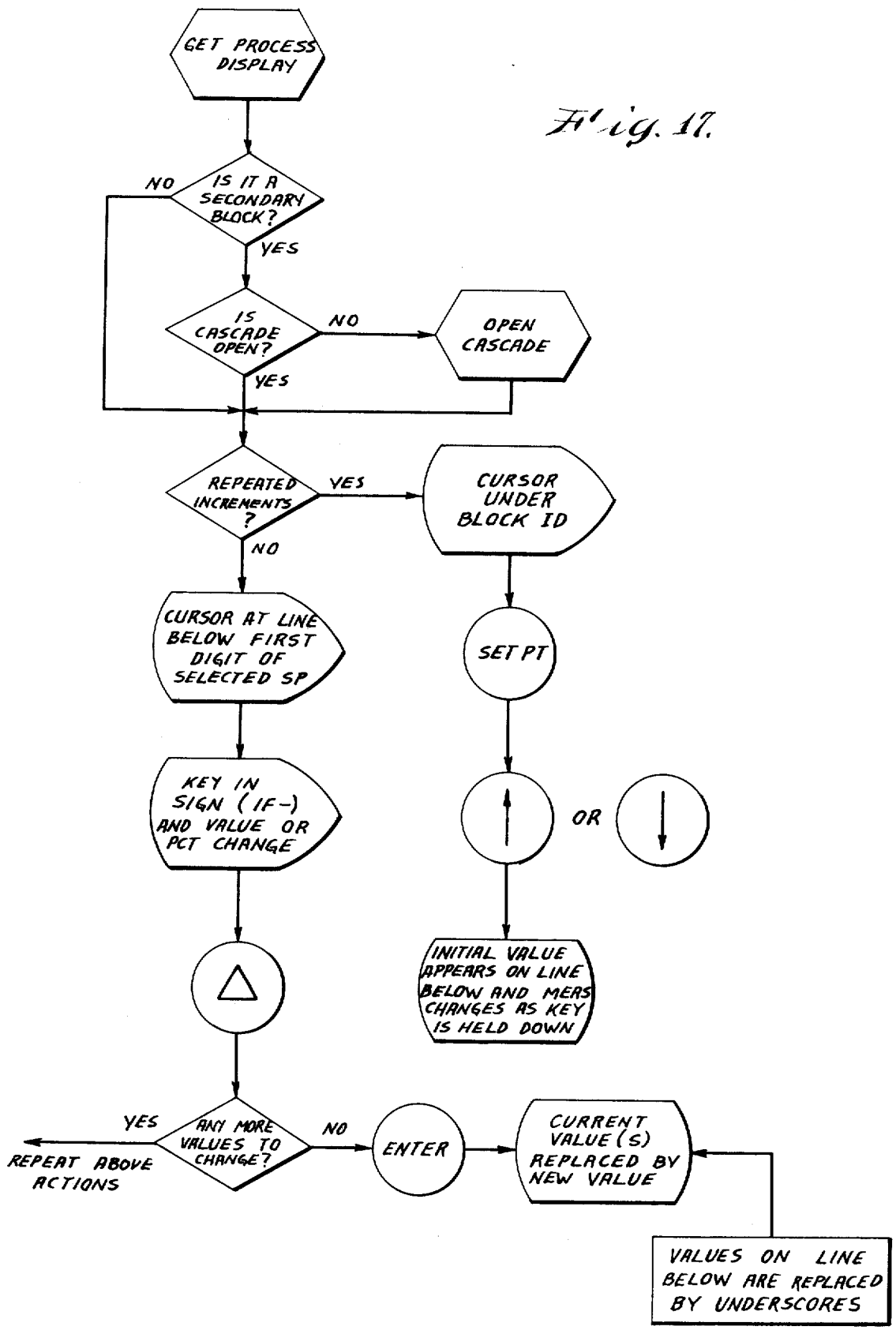
FIG. 17 is a procedural flow diagram for the function of making a change to a set point in the control system.
Figure 19:
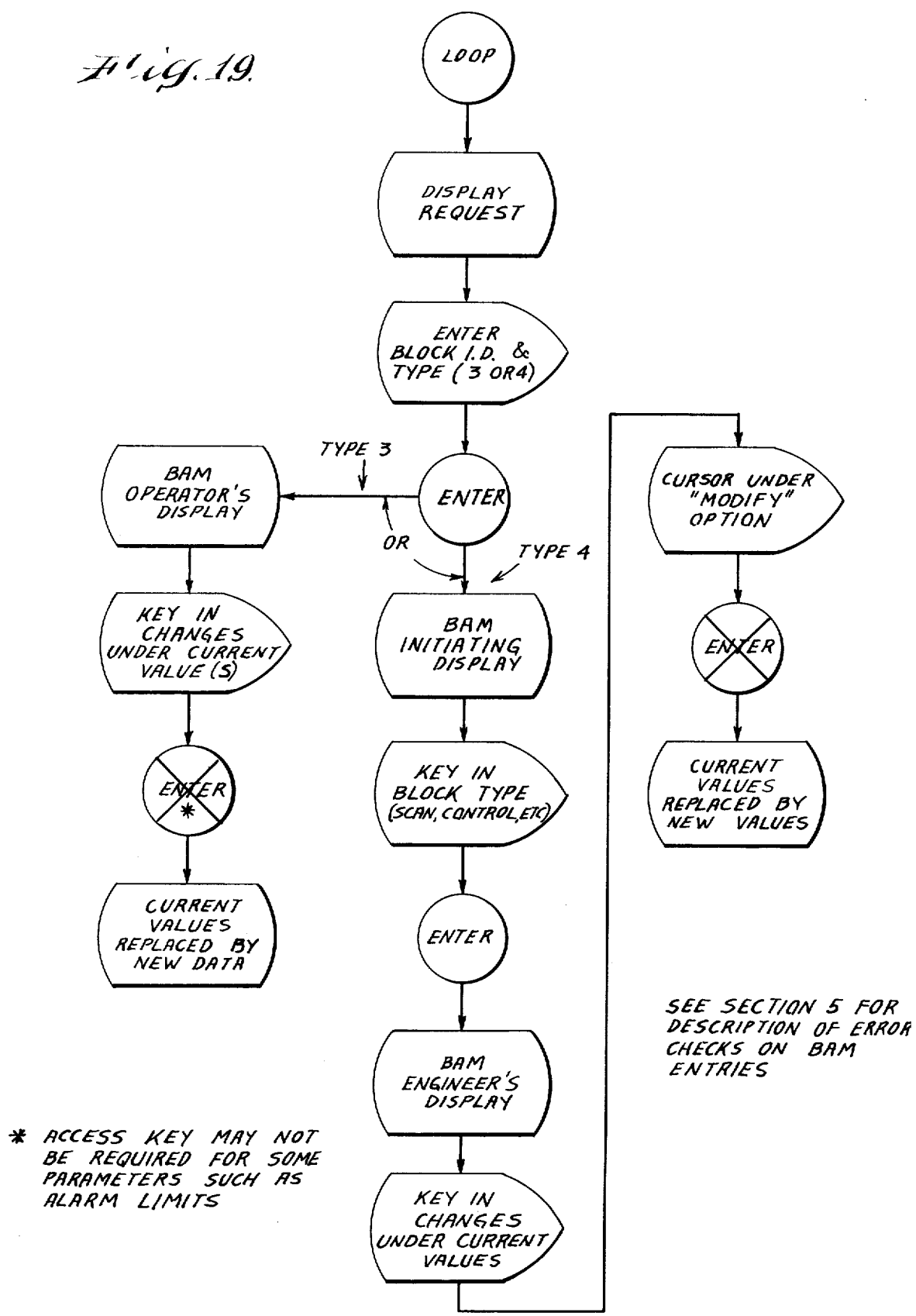
FIG. 19 is a flow diagram representation.

A measurement can only be changed when it is off scan, as indicated by an OFF in the SCN column of the process display. Setpoints can be changed at any time, provided the control block is not the secondary of a closed cascade. FIG. 17 presents a flow diagram of the procedural steps carried out by the processor software and the operator. An attempted setpoint entry will be clamped if it is outside the clamp limits for the block. Upon any illegal entry the rejected value is blinked. Outputs to a control station can be changed once the output state has been set to manual. When this is done, MAN appears in the MODE column.

Alarm limits may be changed via a block display. Values can be changed either by using the absolute value or single increment procedure (see above). Scan and control block parameters also can be changed using either the absolute or single increment techniques.

The system described above preferably includes process alarm control means for activating the CRT display with appropriate information displays in the event that an alarm condition arises. If a predetermined process variable goes beyond prescribed limits, a light will be energized behind a corresponding one of the console alarm keys (FIG. 2b), to signal the operator. Pressing the illuminated key sends a signal to the processor acknowledging the alarm condition.

In response to such acknowledgement, the processor (operating under program control) automatically selects from its memory predetermined display data for transfer to refresh memory 30, to present on the CRT an image showing pertinent information about the part of the process which has encountered the alarm condition. For example, a loop display may be presented, showing the specific block which has gone beyond prescribed limits. From the information on the display, the operator will be better able to take proper action to deal with the alarm condition. Such action may include keyboard interaction with the display, e.g. to alter the status of a part of the control system, to insert new values, etc.

The system preferably also includes facilities for on-line alteration and expansion of the scan and control system by modifying or adding to the parameters within the process data base, i.e., adding or modifying blocks, through keyboard entries onto fill-in-the-blanks forms presented on the CRT, referred to as block addition and modification (BAM). Each such operation deals with only a single block (scan, computational, or control) but since modification of the parameters defining interblock communication is permitted, entire loops can be added, deleted, or modified by using BAM. Only process related information is supplied by the user; file organization, linkage assignment and the maintenance of the cross reference file is done automatically.

Starting with the CRT display "Loop or Block Display Request" form shown in FIG. 12, the operator (a process engineer, for this relatively sensitive procedure), inserts display type 4 in the blank portion and presses Enter. This results in the processor transferring to the refresh memory the character data signals for the BAM Initiating Display (see FIG. 18a). The block ID is not needed, because a block ID has no use until the operation is defined.

To begin a new operation, the operator must fill in some blanks before requesting implementation. He must select the desired BAM operation (ADD or OTHER). For the ADD operation the user must insert the block type (scan, computation, etc.) along with the algorithm number from those available under the block-type column headings on the form, or, alternatively, he may insert the ID of another block which is just like the one to be added. The parameters describing such just like block are generated in the data blanks and the user has only to modify the necessary few parameters to generate the new block. For the OTHER operation, the block ID must be supplied.

After making such insertions, the operator then positions the cursor to INITIATE BAM and depresses the ENTER pushbutton on the console. If the supplied data satisfies certain checks carried out by the processor, in accordance with its programmed software instructions, then the processor will send to the console the display character data for a BAM Engineers Display such as illustrated in FIG. 18b.

The BAM Engineers Display format will vary with the type of block which is selected. The display format is chosen by the computer from the algorithm type entered in the BAM Initiating Display. The formats fall into three catagories: SCAN, COMPUTATION, and CONTROL blocks. FIG. 18b illustrates the SCAN type. The way the formats are used depends upon the BAM operation selected (either ADD or OTHER) in the Initiating Display.

For the ADD operation, the appropriate labels are displayed but, unless the operator indicated the just like option in the Initiating Display, the data spaces are left blank for user entry. If the operator used the just like option, then the display looks as it does for the MODIFY operation, the other blocks' data are displayed in the data spaces, and blanks are provided below the data for user entry. The user needs only to change the few parameters which are different (including the block ID) to generate the new block. The user enters the desired information, positions the cursor to the words ADD BLOCK, and depresses the ENTER console pushbutton.

If the OTHER mode of operation was selected on the Initiating Display, the same labels are displayed on the Engineers Display, but the existing block data is displayed in the appropriate spaces. Writing over the data describing an existing block is inhibited. Directly below each data space is a blank for user entry of the modification data.

The options ADD BLOCK, MODIFY BLOCK, DELETE BLOCK, HARD COPY REPORT, and SIMULATE are shown on the Engineers Display. The user obtains a CRT report of the parameters describing an existing block by using the OTHER mode to obtain a display, and then aborting the operation after examination. If a hard copy report is desired, it can be obtained by positioning the cursor to the words HARD COPY REPORT and depressing the ENTER console pushbutton.

The block is deleted by positioning the cursor to the words DELETE BLOCK and depressing the ENTER console pushbutton. Blocks must be inactive to be deleted. Block modification is accomplished by entering the new data in the appropriate blanks (under the existing data), positioning the cursor at the words MODIFY BLOCK and depressing the ENTER console pushbutton. When the block is modified, the modifying parameters replace the old in the display.

FIG. 18b comprises three separate displays which can be called to the CRT in sequence. Not all blanks need to be filled in for each block to be changed. Where blanks are not filled in, the processor will automatically supply default values when needed to complete the block definition.

Although a specific preferred embodiment of the invention has been described hereinabove in detail, this is not to be considered as necessarily limiting of the invention, it being understood that numerous changes can be made within the scope of the invention to suit the technical requirements of particular applications.

I claim:

1. In an industrial process instrumentation system for use with complex processes having a number of variable process conditions such as temperature, flow rate, and the like, said system comprising:

data processor means arranged to receive signals representing the values of various process conditions, said processor means having data storage means with processor control data stored therein comprising programs and operational base data such as set-point values for performing sequential computations respecting said process conditions so as to produce corresponding output signals for use in controlling the process;

an operating console;

signal transmission means coupling said console to said data processor means to transmit signals thereto and receive signals therefrom;

display means forming part of said console for producing visual images in the form of symbols for inspection by an operator;

memory means storing data signals for controlling said display means, said memory means having a plurality of separate storage locations each adapted to store data signals for establishing the symbolic image in a corresponding position of said display means;

said storage means of said data processor means having data stored therein representing a plurality of sets of display data words to be transmitted over said signal transmission means to said memory means for storage therein to control said display means with each of said sets of display data words defining a respective display presentation symbolically presenting the present status of selected portions of said processor control data respecting at least one corresponding process condition for which computations are being performed by said data processor means and including as part of said presentation preselected symbols identifying display positions where characters may selectively be entered;

memory write in means responsive to said sets of display words received over said transmission means from said data processor means to store in said memory means data signals identifying the selected symbols to be displayed on said display means and stored in memory means storage locations corresponding to display positions where the symbols are to be displayed, thereby to present on said display means for operator inspection the display presentation corresponding to the selected set of display data words transmitted to said console;

manually-operable data entry means coupled to said memory means for inserting therein data signals representing symbols desired to be displayed on said display means;

said data entry means including means operable while any one of said display presentations is presented on said display means to enter into at least one predetermined location in said memory means as identified by at least one of said preselected symbols signals representing changed data for at least a part of said processor control data respecting a particular condition of said process about which information is then presented on said display means responsive to the set of display words received by said memory means from said data processor means, said entered data signal serving to develop a corresponding symbol on said display in a position corresponding to said predetermined location; and manually-controllable read out means coupled to said memory means to direct said changed data signals entered by said data entry means into said predetermined location of said memory means to said transmission means for transmittal on to said data processor means to alter correspondingly said processor control data for said particular process condition thereby to alter correspondingly the subsequent computations respecting said particular condition, whereby the processing carried out by said processor means is readily controllable by data inserted by an operator into selected locations of said memory means as determined by symbolic information presented on said display means by signals from said central data processor.

2. A system as claimed in claim 1, wherein the selected processor control data presented by said display presentation includes characters representing the set-point value for said particular process condition; and said data entry means includes means to enter into said one predetermined location of said memory means a signal representing a changed set-point value for said particular process condition for transmittal on to said data processor means to correspondingly alter the set-point value previously forming part of said processor control data for that particular process condition, whereby the subsequent computations for that particular process condition are carried out using the new set-point value.

3. A system as claimed in claim 1, wherein the display presentation includes blank spaces for the entry of new data signals to be transmitted on to said data processor means;

said preselected symbols being located positionally adjacent said blank spaces to indicate to the operator where the new data signals are to be entered.

4. A system as claimed in claim 3, wherein said preselected symbols are horizontal lines appearing as underlines beneath the blank spaces into which new symbols are to be entered by said data entry means.

5. In an industrial process instrumentation system for use with complex processes having a number of variable process conditions such as temperature, flow rate, and the like, wherein the system comprises data processor means arranged to receive signals representing the values of various process conditions, said processor means having storage means with processor control data stored therein comprising program sequences and operational base data such as condition set-point values required for carrying out on a time-sharing basis sequential computations respecting said process conditions to produce corresponding output signals for use in controlling the process; said storage means also having stored therein a plurality of sets of display data words with each set defining the symbols of a visual display to be presented to an operator comprising symbols representing the present status of selected portions of said processor control data respecting at least one of said process conditions for which computations are performed by said processor means, the system further including operating means and signal transmission means coupling said operating means to said data processor means to transmit signals thereto and receive signals therefrom; display means forming part of said operating means for producing visual images in the form of symbols for inspection by an operator; memory means for storing data signals for controlling said display means, said memory means having a plurality of storage locations each adapted to store data signals for establishing the symbol in a corresponding position of said display means; the operating means further having manually-operable data entry means for inserting into said memory means locations data signals representing symbols for presentation on said display means;

the method of operating said instrumentation system comprising the steps of;

transmitting from said processor means through said transmission means to said operating means one of said sets of display data words specifying symbols to be presented in predetermined respective positions on said display means to form a corresponding one of said display presentations and including information symbols representing the present status of selected portions of the processor control data for at least one particular process condition respecting which computations are performed by said processor in accordance with the corresponding processor control data;

storing said display data words in corresponding locations of said memory means;

inserting at least one data signal from said data entry means into a location of said memory means corresponding to a predetermined display position on said display means forming part of said display presentation developed by the set of display words transmitted thereto by said data processor means, said one data signal producing a corresponding symbol on said display means and representing an instruction for the change of data respecting part of the processor control data for said particular process condition;

transmitting from said memory means to said data processor means said one data signal entered by said data entry means in said location of said memory corresponding to said predetermined display position; and altering the processor control data stored in said processor storage means for said particular process condition in accordance with said one data signal transmitted from said memory means to said central data processor, whereby to alter correspondingly the computational processing respecting said particular process condition in accordance with the instruction represented by said data signal entered in said memory means.

6. The method of claim 5, wherein said data signal entered into said memory means defines a change to be made to the set-point value of said particular process condition;

said processor control data being altered in response to said data signal to identify a new set-point value for said particular process condition.

7. The method of claim 5, wherein said sets of display words transmitted from said data processor means to said operating means include signals producing horizontal lines on said display means to indicate blank spaces where the operator is to insert data signals for transmittal on to said data processor means to alter the processor control data to provide changed computations respecting a process condition.

8. In an industrial process instrumentation system for use with complex processes having a number of variable process conditions such as temperature, flow rate, and the like, said system comprising:
- signal processing means arranged to receive signals representing the values of different variable process conditions to be controlled, said signal processing means including data storage means with processing control data stored therein including operational base data such as set-point values for use in carrying out required signal processing respecting said variable process conditions so as to produce corresponding output signals for use in controlling the process condition;
- an operating console;
- signal transmission means coupling said console to said signal processing means to transmit signals thereto and receive signals therefrom;
- display means forming part of said console for producing visual images in the form of symbols for inspection by an operator;
- memory means at said console including means storing data signals for controlling said display means, said memory means including a plurality of separate storage locations each adapted to store data signals for establishing the symbolic image in a corresponding position of said display means;
- display signal storage means having data stored therein representing a plurality of display data words to be transmitted to said memory means for storage therein to control said display means with sets of said display data words defining respective display presentations symbolically presenting the present status of selected portions of said processing control data respecting corresponding variable process conditions for which signal processing operations are being performed by said signal processing means and including as part of said presentation a preselected location characterizer identifying at least one display position where characters may selectively be entered;
- memory write-in means responsive to said sets of display words received from said display signal storage means to store in said memory means data signals identifying the selected symbols to be displayed on said display means and stored in memory means storage locations corresponding to display positions where the symbols are to displayed, thereby to present on said display means for operator inspection the display presentation correponding to a selected set of display data words transmitted to said memory means;
- manually-controllable means for operating said display means including data entry means for inserting into said memory means data signals representing symbols desired to be displayed on said display means;
- said data entry means including means operable while any one of said display presentations is presented on said display means to enter changed data signals into said memory means for storing in at least one predetermined location in said memory means as identified by said preselected location characterizer symbol signals representing changed data for at least a part of said processing control data respecting a particular condition of said process about which information is then presented on said display means responsive to the set of display words received by said memory means from said display signal storage means, thereby to develop a corresponding symbol on said display in a position corresponding to said one predetermined location; and
- means coupled to said transmission means for directing therethrough to said signal processing means signals corresponding to said changed data signals to alter correspondingly said processing control data for said particular process condition thereby to alter correspondingly the subsequent signal processing respecting said particular condition, whereby the processing carried out by said signal processing means is readily controllable by data inserted by an operator into selected locations of said memory means as represented by symbolic information presented on said display means by signals from said memory means.

9. In an industrial process instrumentation system for use with complex processes having a number of variable process conditions such as temperature, flow rate, and the like, wherein the system comprises signal processing means arranged to receive signals representing the values of different variable process conditions to be controlled, said processing means having data storage means with processing control data stored therein comprising operational base data such as process condition set-point values for use in carrying out predetermined signal processing operations respecting said variable process conditions so as to produce corresponding output signals for use in controlling the process conditions; the system further including display signal storage means having stored therein a plurality of display data words with sets thereof defining the symbols of visual display presentations to be presented to an operator including graphic symbols representing the present status of selected portions of said processing control data respecting at least one of said variable process conditions for which signal processing operations are being performed by said signal processing means; the system still further including operating means and signal transmission means coupling said operating means to said signal processing means to transmit signals thereto and receive signals therefrom; display means forming part of said operating means for producing visual images in the form of symbols for inspecting by an operator; memory means including means for storing data signals for controlling said display means, said memory means having a plurality of storage locations each adapted to store data signals for establishing the symbol in a corresponding position of said display means; the operating means further having manually-operable data entry means for inserting into said memory means data signals representing symbols for presentation on said display means at positions corresponding to the storage locations in said memory means;

the method of operating said industrial process instrumentation system comprising the steps of;

transmitting from said display signal storage means a set of display data words specifying symbols to be presented in predetermined respective positions on said display means to form a corresponding one of said display presentations and including information symbols representing the present status of selected portions of the signal processing control data for at least one particular process condition respecting which signal processing operations are performed by said signal processing means making use of the corresponding processing control data;

storing said transmitted display data words in corresponding locations of said memory means;

developing at least one data signal through operation of said data entry means;

entering said one data signal in said memory means for storage therein in a location of said memory means corresponding to a predetermined display position on said display means forming part of said display presentation developed by the set of display words transmitted thereto from said display signal storage means, said one data signal representing information defining a corresponding symbol to be displayed on said display means and identifying a change of data respecting part of the processing control data for said particular process condition;

transmitting to said signal processing means a signal corresponding to said one data signal entered by said data entry means; and altering the processing control data stored in said data storage means for said particular process condition by substituting a signal corresponding to said one data signal, whereby to alter correspondingly the signal processing operations carried out respecting said particular process condition in accordance with the instruction represented by said data signal developed by said data entry means, the changed data signal stored in said memory means serving to permit the operator to view the changed display presentation on said display means to check it for accuracy.

10. An industrial process instrumentation system for use with complex processes having a number of variable process conditions such as temperature, flow rate, and the like, comprising:

signal processing means arranged to receive signals representing the values of different variable process conditions to be controlled, said signal processing means including data storage means with processing control data stored therein including operational base data such as set-point values for use in carrying out required signal processing respecting said variable process conditions so as to produce corresponding output signals for use in controlling the process condition;

an operating console;

signal transmission means coupling said console to said signal processing means to transmit signals thereto and receive signals therefrom;

display means forming part of said console for producing visual images in the form of symbols for inspection by an operator;

memory means including means storing data signals for controlling said display means and incorporating a plurality of separate storage locations each adapted to store data signals for establishing the symbolic image in a corresponding position of said display means so as to provide for controlling said display means with any of a plurality of sets of display data works defining respective display presentations symbolically presenting a plurality of items of information including the present status of selected portions of said processing control data;

manually-controllable means for operating said display means including data entry means for inserting into said memory means data signals representing information desired to be displayed symbolically on said display means to represent changed data for at least a part of said processing control data respecting a particular condition of said process about which information is then presented on said display means reponsive to a particular set of display words; and means coupled to said transmission means for directing therethrough to said signal processing means signals corresponding to said changed data to alter correspondingly said processing control data for said particular process condition thereby to alter correspondingly the subsequent signal processing respecting said particular condition, whereby the processing carried out by said signal processing means is readily controllable by data inserted by an operator and stored in selected locations of said memory means as identified by symbolic information presented on said display means.

11. In an industrial process instrumentation system for use with complex processes having a number of variable process conditions such as temperature, flow rate, and the like, wherein the system comprises signal processing means arranged to receive signals representing the values of different variable process conditions to be controlled, said processing means having data storage means with processing control data stored therein comprising operational base data such as process condition set-point values for use in carrying out predetermined signal processing operations respecting said variable process conditions so as to produce corresponding output signals for use in controlling the process conditions; the system further including display signal storage means having stored therein a plurality of display data words with sets thereof defining the symbols of visual display presentations to be presented to an operator including graphic symbols representing the present status of selected portions of said processing control data respecting at least one of said variable process conditions for which signal processing operations are being performed by said signal processing means; the system still further including operating means and signal transmission means coupling said operating means to said processing means to transmit signals thereto and receive signals therefrom; display means forming part of said operating means for producing visual images in the form of symbols for inspection by an operator; memory means including display memory locations adapted to store data signals for establishing the symbols in corresponding positions of said display means; the operating means further having manually-operable data entry means for inserting into said memory means data signals representing information for symbolic presentation by said display means;

the method of operating said industrial process instrumentation system comprising the steps of;

storing in predetermined respective display memory locations a set of display data words to form on said display means a corresponding display presentation and including information symbols representing the present status of selected portions of the signal processing control data for at least one particular process condition respecting which signal processing operations are performed by said signal processing means;

developing through operation of said data entry means at least one data signal representing a change of data respecting part of the processing control data for said particular process condition;

transmitting to said signal processing means a signal corresponding to said one data signal entered by said data entry means to alter the processing control data stored in said data storage means for said particular process condition in accordance with said one data signal, whereby to alter correspondingly the signal processing operations carried out respecting said particular process condition in accordance with the instruction represented by said data signal developed by said data entry means; and storing in one of said display memory locations a new data signal corresponding to the altered control data to provide the operator with a graphic display of such control data to permit checking for accuracy.

* * * * *